United States Patent

James

[11] Patent Number: 5,987,113
[45] Date of Patent: Nov. 16, 1999

[54] LONG DISTANCE PHONE TAG SERVICE

[75] Inventor: Daniel Lee James, Garland, Tex.

[73] Assignee: Northern Telecom Limited, Montreal, Canada

[21] Appl. No.: 08/773,521

[22] Filed: Dec. 23, 1996

[51] Int. Cl.6 .................................................. H04M 3/42
[52] U.S. Cl. ......................... 379/211; 379/209; 379/220
[58] Field of Search .................................. 379/201, 209, 379/211, 212, 202, 216, 219, 220, 221

[56] References Cited

U.S. PATENT DOCUMENTS

| | | | |
|---|---|---|---|
| 4,796,293 | 1/1989 | Blinken et al. | 379/202 |
| 4,847,890 | 7/1989 | Solomon et al. | 379/212 |
| 4,910,766 | 3/1990 | Ogino et al. | 379/201 |
| 4,969,185 | 11/1990 | Dorst et al. | 379/209 |
| 5,086,394 | 2/1992 | Shapira | 379/201 |
| 5,260,986 | 11/1993 | Pershan | 379/209 |
| 5,311,570 | 5/1994 | Grimes et al. | 455/417 |
| 5,315,636 | 5/1994 | Patel | 455/461 |
| 5,325,424 | 6/1994 | Grube | 379/216 |
| 5,392,342 | 2/1995 | Rosenthal | 379/211 |
| 5,408,518 | 4/1995 | Yunoki | 379/202 |
| 5,430,791 | 7/1995 | Feit et al. | 379/211 |
| 5,452,340 | 9/1995 | Engelbeck et al. | 379/216 |
| 5,479,489 | 12/1995 | O'Brien | 379/216 |
| 5,479,494 | 12/1995 | Clitherow | 379/216 |
| 5,483,587 | 1/1996 | Hogan et al. | 379/202 |
| 5,537,470 | 7/1996 | Lee | 379/209 |
| 5,539,813 | 7/1996 | Jonsson | 379/202 |
| 5,581,611 | 12/1996 | Yunoki | 379/216 |
| 5,619,555 | 4/1997 | Fenton et al. | 379/202 |
| 5,692,036 | 11/1997 | Saito | 379/216 |
| 5,761,289 | 6/1998 | Keshav | 379/216 |

*Primary Examiner*—Scott Wolinsky
*Attorney, Agent, or Firm*—Foley & Lardner

[57] ABSTRACT

A phone service for preventing missed connections and "phone tag" that commonly happens and, in particular, helps people contact people who are traveling is disclosed. A user registers the phone number at which he or she is currently located with a service controller which maintains a database of such user registrations. The user may also prioritize the identities of other users with whom he or she wishes to contact. When the service controller determines that a first user wishes to get in contact with a second user and that both users have current locations registered in the database, then the service controller will call both users and connect them to each other.

4 Claims, 8 Drawing Sheets

FIG. 1

```
LDPT SERVICE ALGORITHM        FIG. 2
    DO FOREVER
    {
        WAIT FOR LDPT ID
        IF PASSCODE REQUIRED
        {
            WAIT FOR PASSCODE
            PROMPT FOR COMMAND
            CASE COMMAND
            {
                GET LIST OF CALLERS
                {
                    SEND CALLER LIST OF PEOPLE WHO DESIRE TO CALL
                }
                REGISTER LOCATION
                {
                    REGISTER CALLER'S LDPT ID NUMBER WITH GIVEN LOCATION
                    APPEND IF OTHER NUMBERS ARE ALREADY LISTED.
                    IF ALL PARTIES IN A DESIRED CALL ARE AVAILABLE
                        ATTEMPT TO CONNECT PARTIES
                        IF SUCCESSFUL, REMOVE DESIRED CALL REGISTRATION
                }
                REGISTER DESIRED CALL
                {
                    REGISTER LDPT ID'S OF CALLED PARTIES
                    IF ALL CALLED PARTIES ARE AVAILABLE
                        ATTEMPT TO CONNECT PARTIES
                        IF SUCCESSFUL, REMOVE DESIRED CALL REGISTRATION
                }
                REGISTER ACCEPTANCE LIST
                {
                    REGISTER LDPT ID'S OF PARTIES TO BE ACCEPTED
                    REGISTER PRIORITIES IF REQUESTED
                }
                UNREGISTER LOCATION
                {
                    DISASSOCIATE THE GIVEN NUMBER FROM THE CALLER'S LDPT NUMBER
                    DISASSOCIATE ALL NUMBERS FROM THE CALLER'S LDPT NUMBER
                }
                UNREGISTER DESIRED CALL
                {
                    REMOVE SPECIFIED DESIRED CALL FROM DESIRED CALL LIST
                }
                UNREGISTER ACCEPTANCE LIST
                {
                    UNREGISTER ACCEPTANCE LIST
                }
            }
        }
    }
```

LONG DISTANCE PHONE TAG SERVICE

FIELD OF THE INVENTION

This invention generally relates to personal telecommunications services and, in particular, to such a service that allows subscribers to contact each other while away from their usual telephone lines or directory numbers.

BACKGROUND OF THE INVENTION

People who are busy or traveling can have great difficulty contacting each other by telephone. A person can be at several locations during the day, each of which can be reached only by a telephone line unique to that location. Messages can be left, but by the time the recipient receives the message the caller may have moved on to a new location and can no longer be reached at the phone number indicated in the message. This is commonly called "phone tag". In addition, the person receiving the call may not want to be disturbed at that time, or may want to hear from certain people rather than others.

Several solutions to the problem of phone tag are known. One such solution is to use cellular telephones which allow a single telephone number to relocate with the subscriber. However cellular telephones are limited by service area and are not affordable to the average subscriber. Another known solution is call forwarding service which can be used to forward calls to the recipient's present location, but blindly forwards all calls irrespective of who the caller is or whether the called person is ready to receive a call at that time. Call forwarding must also be updated through the subscriber's primary phone line as the subscriber moves from location to location.

U.S. Pat. No. 5,315,636 presents a yet further solution in which a subscriber carries a small communication device that alerts a nearby base station as to the subscriber's location. When the subscriber receives an incoming call the service consults a lookup table to determine the phone line that the subscriber has associated with that base station. The disadvantage of this solution is that special hardware is needed at various locations. The subscriber is also unable to prioritize callers or selectively block out certain callers.

An alternative solution to the phone tag problem is desired.

SUMMARY OF THE INVENTION

It is an object of the present invention to provide a new and improved telecommunications network based phone tag service.

The invention, therefore, according to a first broad aspect provides in a telecommunications network, a method of effecting a service for a user to contact a desired subscriber of the service, comprising the steps of: maintaining subscriber identifiers in association with respective network locations; receiving, from the user, a contact request including an identification of the desired subscriber, and a user network location; and establishing through the network, responsive to correlating the desired subscriber identification to a particular identifier in the maintained subscriber identifiers, a call which terminates at the user network location and the network location associated with the particular identifier.

In accordance with a second broad aspect of the invention, there is provided in a telecommunications network, a method of enabling a first person to contact a second person, comprising the steps of: maintaining location information including network locations associated with respective identifiers; receiving, through a call from the first person, an identification of the first person and a request to contact the second person, the request including an identification of the second person; maintaining, responsive to the contact request, an association between the first person identification and the second person identification; and responsive to correlating the first person identification and the second person identification to respective first and second particular identifiers in the maintained location information, establishing through the network a call that terminates at the network locations associated with the first and second particular identifiers and removing the maintained association between the first person identification and the second person identification.

In accordance with a third broad aspect of the invention, there is provided in a telecommunications network, a system for effecting a service by which a user can contact a desired subscriber of the service, comprising the steps of: means for maintaining subscriber identifiers in association with respective network locations; means for receiving, from the user, a contact request including an identification of the desired subscriber, and a user network location; and means for establishing through the network, responsive to correlating the desired subscriber identification to a particular identifier in the maintained subscriber identifiers, a call which terminates at the user network location and the network location associated with the particular identifier.

In accordance with a fourth broad aspect of the invention, there is provided in a telecommunications network, a system for enabling a first person to contact a second person, comprising the steps of: means for maintaining location information including network locations associated with respective identifiers; means for receiving, through a call from the first person, an identification of the first person and a request to contact the second person, the request including an identification of the second person; means for maintaining, responsive to the contact request, an association between the first person identification and the second person identification; and means, responsive to correlating the first person identification and the second person identification to respective first and second particular identifiers in the maintained location information, for establishing through the network a call that terminates at the network locations associated with the first and second particular identifiers and for removing the maintained association between the first person identification and the second person identification.

The present invention may be manifested by a telecommunications service that solves the problem of phone tag. The effectiveness of this service depends upon people wanting to be contacted and taking steps to make themselves contactable, and in this way, it is not a "people-tracking" service which would potentially infringe upon personal rights. For people who do want to contact each other, this service can be quite convenient.

A subscriber or user may contact the service from any telephone or through a computer by dialling a special service number. The subscriber typically enters a service identification (ID) code and perhaps a password, and is then prompted for a command. In general, the subscriber is a user who has been assigned an ID by which that user is known to the service. It, however, is not necessary for all users of the service to be subscribers.

The subscriber can request a list of other users who desire to contact that subscriber. The list may be heard by dial-in, but may also be uploaded to a computer.

The subscriber can register his or her current location. The location may be registered by manually dialling the phone or directory number at which the subscriber wants to be called. Alternative means for registering the subscriber's location include manually entering the location through a computer, automated registration of the location by computer telephony, speed dialing the location, and tracking and predicting the subscriber's location using auxiliary artificial intelligence (AI) components, specifically a neural network for learning a person's habits.

The subscriber or any user can register a desired call. This may be done by entering the service ID of a second subscriber which a first subscriber wishes to contact. The second subscriber's service ID may be registered by, for example, manually dialling the service ID, manually entering it through a computer, automated registration by computer telephony, speed dialing the second subscriber's service ID, or verbally stating the second subscriber's service ID which is then interpreted using speech recognition algorithms. If a user wishes to contact a subscriber but that user is not a subscriber (i.e., does not have a unique ID registered with the service), the user may still register a desired call to a particular subscriber by providing the service with the ID of the desired subscriber and the user's current location.

The subscriber can register an acceptance list, indicating other subscribers from whom the first subscriber is willing to accept calls. The acceptance list may be registered by manually dialling the service IDs of the other subscribers. Alternative means for registering the acceptance list include manually entering the acceptance list at a computer, automated registration of the acceptance list by computer telephony, speed dialling the acceptance list, or selecting from a list of callers who desire to contact the subscriber.

The subscriber can also assign priorities to the subscribers listed in the acceptance list. Priority may be determined, for example, from the order of the subscribers' service IDs in the acceptance list or by entering a priority code in response to a recitation of each service ID in the acceptance list.

Furthermore, the subscriber can unregister the subscriber's location, any previously entered desired calls, and the acceptance list. The subscriber also can carry out standard service administration, such as changing the subscriber's passcode.

The service provider might publish the ID codes of all people who subscribe to the phone tag service, so that users may reference these published codes to facilitate registering desired calls and generating acceptance lists. In this case, password protection is useful to provide secured access to the service by each subscriber. Also, the service provider could place restrictions on who is eligible to be a desired called party, and it could assign a unique ID to all callers or to only those who request the ID, whether or not they subscribe to the service.

Advantages over known solutions to the phone tag problem include that any phone around the world can be used in the service, unless it has been expressly blocked. When the service controller determines that one subscriber wishes to get in contact with a second subscriber, and both subscribers have current locations registered in the service database, then the service controller will call both subscribers and connect them to each other. Each subscriber can also prioritize the identities of other subscribers with whom he or she wishes to contact.

Another advantage is that aside from the central service controller and database, no additional hardware is needed, such as pagers, radio transmitters, or base stations.

BRIEF DESCRIPTION OF THE DRAWINGS

The invention will be better understood from the following description of a long distance phone tag (LDPT) service, together with reference to the accompanying drawings in which.

DETAILED DESCRIPTION

Firstly, an overview of a phone tag service, in accordance with the invention, is presented. This is followed by descriptions of an exemplary system architecture and operation, whereby the phone tag service may be implemented.

SERVICE OVERVIEW

Long distance phone tag (LDPT), a preferred embodiment of the present invention, is a call service that helps busy and travelling people get in touch with one another. This service solves the problem of missed connections, no more "phone tags" where people leave messages for each other in parry fashion. It enables people to get in touch with each other when they want to, by: tracking (1) who wants to contact who, (2) when people are ready to receive calls, and (3) where people are ready to receive the calls; and then ringing the respective parties when they are ready.

Following describes a general, basic procedure for using the LDPT service from a user perspective. More detailed steps may be applied by advanced users or through automation. The order of the procedure steps is not important. The LDPT service will still function properly according to the rules and attributes given below.

The basic procedure for using the LDPT service by subscriber A who wants to be contacted, includes the steps of:

A registers his or her location, by signifying at which telephone number A can be reached.

A optionally registers people from whom he or she wishes to be contacted.

A waits for ring.

If A moves to different location, A registers the new number and waits for ring.

The basic procedure for a user B who wants to contact subscriber A, includes the steps of:

B registers his or her location, signifying at which number B can be reached.

B registers the subscribers who he or she wishes to contact, in this example, subscriber A.

B waits for ring, which may correspond to a call being established by the LDPT service attempting to connect A and B.

If B moves to different location, B registers the new number and waits for ring.

The following is a list of attributes of the LDPT service:

(a) Registration of a subscriber's location, typically a telephone (directory) number, which may be:
manually performed at a computer
automated by computer telephony manually dialed
speed dialed
tracked and predicted by auxiliary AI components
used for multiple locations
(b) Registration of who a user wants to contact, which may be:
manually performed at a computer
automated by computer telephony
manually dialed
speed dialed
spoken and recognized by auxiliary AI components
(c) Information about who wants to contact a subscriber, which may be:
uploaded to computer
heard by dial-in
(d) Control of who to allow contact with, which may be:
manually performed at a computer
automated by computer telephony
manually dialed
speed dialed At least one attribute from sections (a) and (b) should be implemented for effecting the service. Which attributes are actually implemented is optional and may be determined by the service provider.

Lastly, the following is a list of rules of the LDPT service:
(a) Connections will be attempted when the following are true:
one person wants to contact one or more other people
all persons specified have registered locations with the LDPT service
registered termination lines do not block LDPT
(b) If more than one person has registered to contact the same person, then:
connections can be attempted in FIFO order on those people who are available
FIFO order can be overridden by setting priorities for certain people
(c) Subscribers can choose who they want to be connected to via LDPT by:
choosing from a list of waiting people
registering a list of valid callers
(d) Subscribers can change the order of who they want to be connected to via LDPT by:
altering a list of waiting people
registering priority
(e) Users are not necessarily required to have a LDPT identification number, although restrictions may be made by the service provider.

The implementation of these rules is affected by which attributes are implemented, and therefore the implementation of some rules is optional. For example, if the attribute for getting information about who wants to contact you has not been implemented, then there is no use in implementing the rule for "choosing from a list of people" below. Likewise, if LDPT blocking has not been implemented, then it does not need to be checked for.

SYSTEM ARCHITECTURE OF LDPT SERVICE

Figure 1:
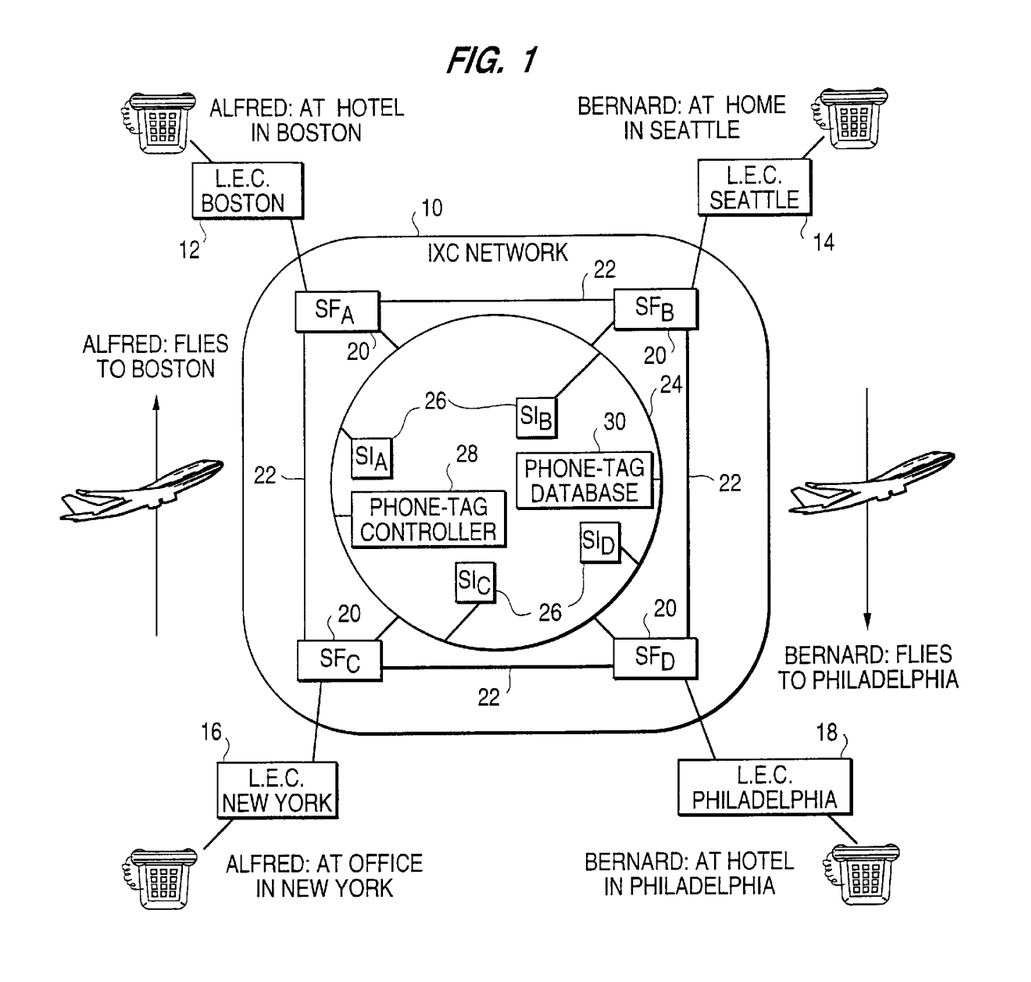
FIG. 1 is a schematic diagram showing various components manifesting the LDPT service as part of a telephone network architecture.

Referring to FIG. 1, depicted for illustration of the long distance configuration of the phone tag (LDPT) service is an inter-exchange carrier (IXC) network 10 communicatively coupled to various local exchange carrier (LEC) networks which, for purposes of illustration, service Boston 12, Seattle 14, New York 16 and Philadelphia 18. The IXC network 10 includes four switching fabric (SF) units 20, individually identified as $SF_A$, $SF_B$, $SF_C$ and $SF_D$, which are interconnected by voice transmission facilities 22 and which are respectively connected to the LEC Boston 12, LEC Seattle 14, LEC New York 16 and LEC Philadelphia 18. The SF units 20 are communicatively coupled, through a signalling network 24, to four switching intelligence (SI) units 26 which are individually identified as $SI_A$, $SI_B$, $SI_C$ and $SI_D$. A LDPT service controller 28 and a LDPT database 30 are also connected to the signalling network 24.

The SI units 26, via the signalling network 24, control call processing in the SF units 20 and interacts with the LDPT service controller 28. Within the IXC network 10, the call processing control effected by each of the SI units 26, namely $SI_A$, $SI_B$, $SI_C$ and $SI_D$, corresponds to call processing that occurs at $SF_A$, $SF_B$, $SF_C$ and $SF_D$, respectively, of the SF units 20. In operation, the SF units 20 act as dumb switches under the control of the SI units 20. The SI units 26 also act as interfaces to remote call services that may exert limited control over a call process.

LDPT is one of these remote call services. Through the signalling network 24, messages from the SF units 20 are passed to the corresponding SI units 26, detected as requiring LDPT service control, and passed to the LDPT service controller 28. The functionality of the SI units 26 is hardware platform independent and may be implemented, for example, by a UNIX box, personal computer (PC) or other conventional data processing systems.

The SF units 20 provide conventional telecommunications switching system functionality and include basic switching control atomics that may be invoked by the SI units 26. With respect to the long distance configuration of the phone tag service, the SF units 20 may be implemented by a typical tandem office, such as, a DMS-250 switching product from Northern Telecom.

The signalling network 24 may be any known networking hardware/software combination that serves the purpose of connecting the various IXC network components for open communication. Examples of such include Ethernet, Fiber Distributed Data Interconnect (FDDI) and Asynchronous Transfer Mode (ATM) networks.

Figure 2:
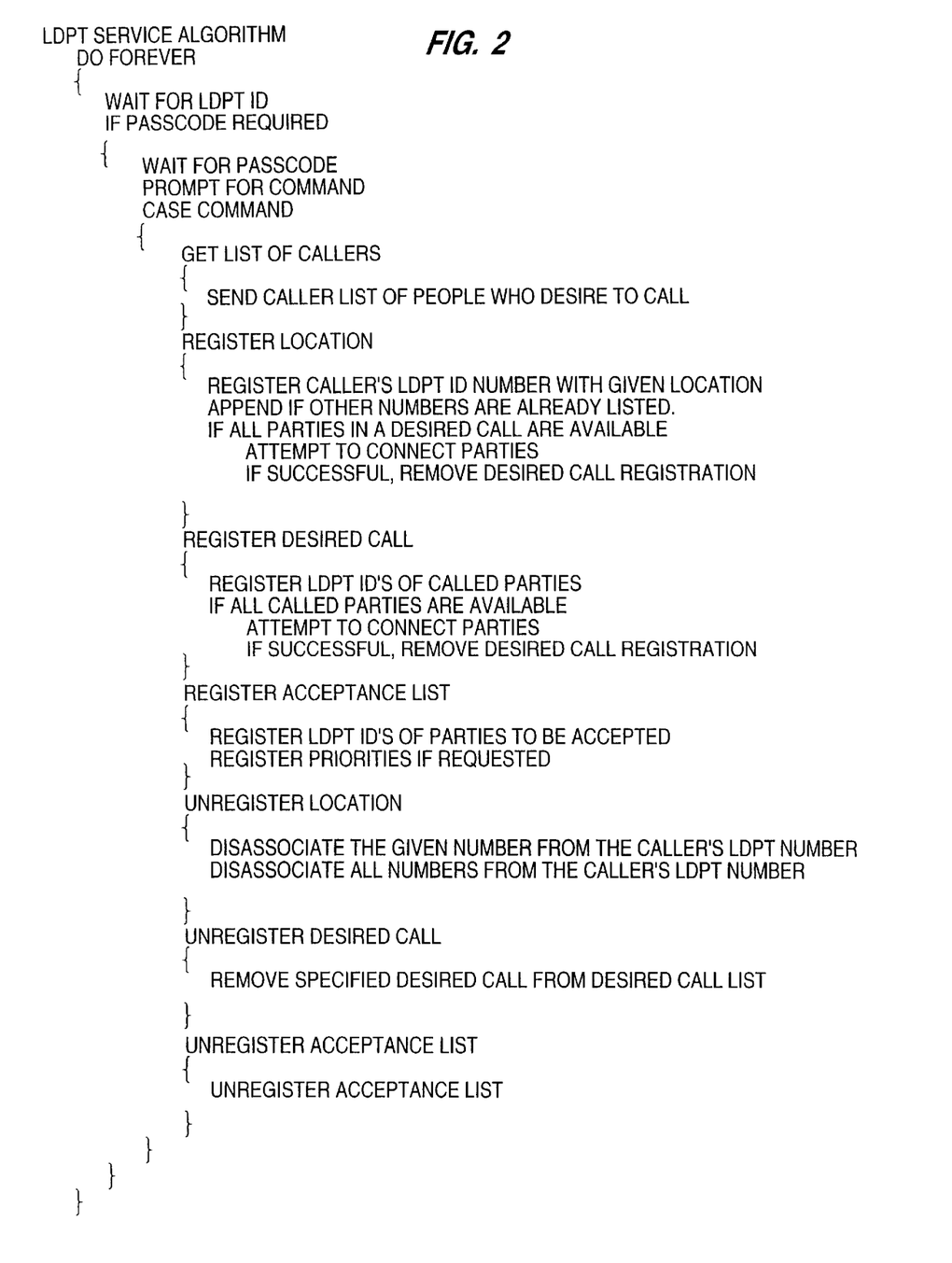
FIG. 2 is a pseudo-code algorithm representing operation at a LDPT service controller within the network.

The LDPT service controller 28 provides functionality that effects the phone tag service, and the LDPT database 30 maintains service related data utilized by the controller 28. These components may be implemented by appropriately programmed data processing systems, for instance, a UNIX box or PC. FIG. 2 illustrates a pseudo-code algorithm which exemplifies executable logic corresponding to the functionality of the LDPT service controller 28. It is noted that there are many ways to organize the algorithm in order to achieve the same functionality, and not all of the details of the phone tag service, in accordance with the present invention, are explicitly part of the algorithm. More specific feature details, for instance user options to choose from lists and the like, are listed in the attributes and rules for the LDPT service described above in the Overview Section. Within the algorithm, the wait and prompt statements have time-out and invalid conditions that result in either call termination and/or error messages.

SYSTEM OPERATION OF LDPT SERVICE

Turning back to FIG. 1, a person wanting to access the LDPT service, within any of LEC Boston 12, LEC Seattle 14, LEC New York 16 and LEC Philadelphia 18, simply calls a predetermined directory number which, for example, may be a toll free number (e.g., 1-800-XXX-XXXX) that is valid in the LEC networks or each LEC network may provide a unique local telephone number associated with the LDPT service. The directory number by which the LDPT service may be accessed is generally referred to herein as the LDPT number. The LEC networks 12, 14, 16 and 18 upon receiving a call dialed to the LDPT number, would route that call to respective SF units 20, namely $SF_A$, $SF_B$, $SF_C$ and $SF_D$, within the IXC network 10.

Figure 3:
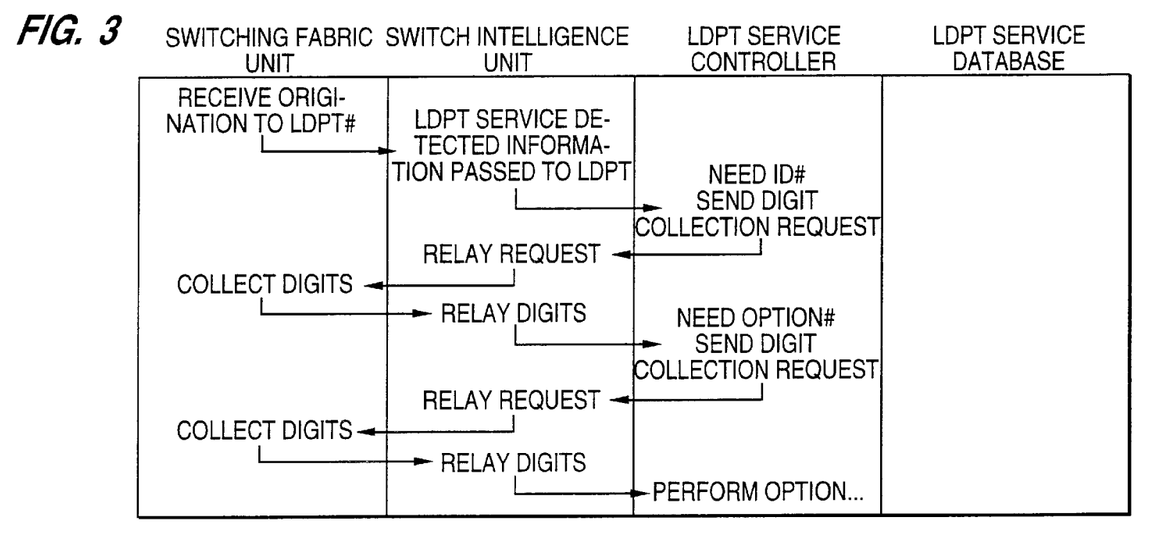
FIGS. 3 to 6 are process flow diagrams illustrating interactions between the various LDPT service components.

Referring to FIG. 3, when any SF unit receives a call origination to a dialed number, as is typical operation, the SF unit passes control of call processing to its corresponding SI unit by sending an appropriate message containing the dialed number which in this particular instance is the LDPT number. The SI unit recognizes the dialed number as requiring interaction with the LDPT service controller and accordingly relays this information on to the LDPT service controller, which then sends a request for the subscriber's ID digits and optionally, a passcode. The request is passed through the SI unit to SF unit, responsive to which an appropriate "collect digits" atomic is executed by the SF unit. Subsequent to collecting the input digits from the caller, the SF unit passes the collected digits to the SI unit, which relays them to the LDPT service controller. The LDPT service controller may validate the input service ID by correlating it to a particular subscriber in a subscriber ID table maintained on the LDPT database. It is noted that this particular configuration of the LDPT service requires all users to be subscribers (i.e., have a service ID to gain access).

Next, the LDPT service controller sends a request for an option number. The SI unit relays the request to the SF unit which, in response, presents an appropriate list of options to the caller and collects the option number digits. Presentation of the list of options is typically in the form of a DTMF-tone based selection menu, for example, press "1" to register location, press "2" to register a desired call, etc. The collected option digits are passed from the SF unit, via the SI unit, to the LDPT service controller which then performs the appropriate option.

Figure 4:
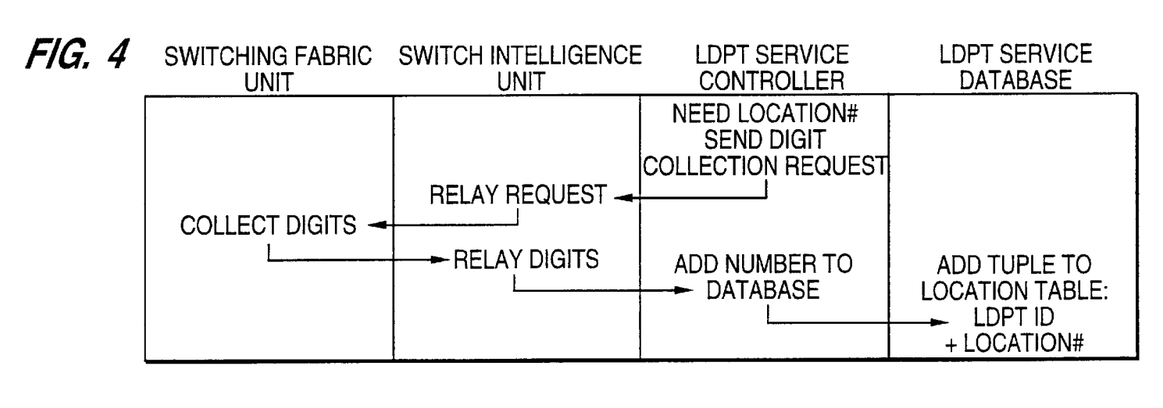

Referring to FIG. 4, if the option digits signify the command "register location", then a digit request goes out to get the number at which the subscriber can be reached by telephone. Once the LDPT service controller receives the information, it registers the location (e.g. directory or telephone) number with the subscriber's service ID in the LDPT service database.

Figure 5:
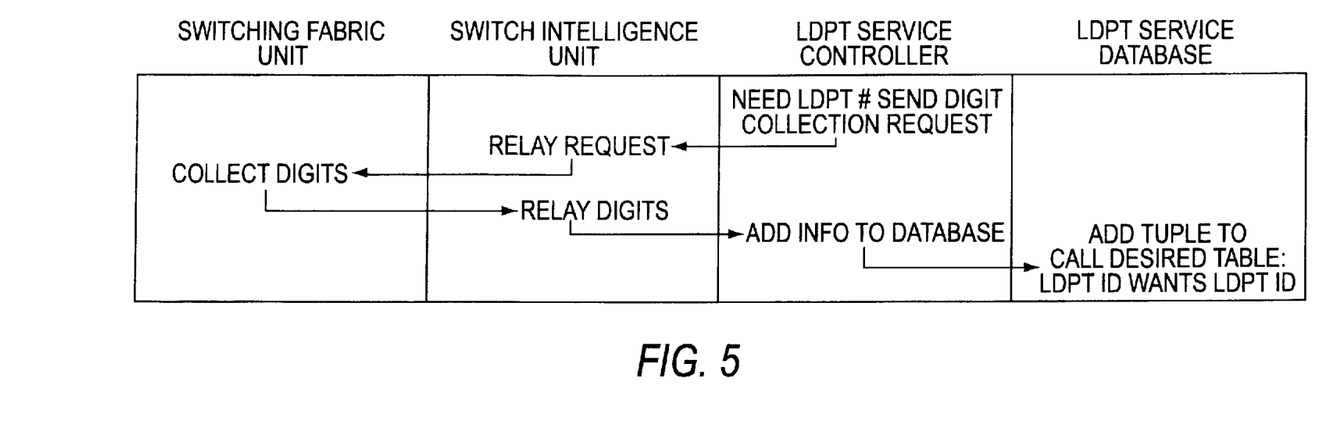

Referring to FIG. 5, if the option digits signify the command "register a desired call", then a digit request goes out to get the service ID of the desired party which the first subscriber wishes to contact. Once the LDPT service controller receives the information, it registers the caller's service ID with the desired subscriber's service ID in the LDPT database.

If the option digits signify the command "register acceptance list", then the process flow is similar to that depicted in FIG. 5. A digit request goes out to collect the service ID of another subscriber from whom the first subscriber is willing to accept calls. Multiple such IDs may be specified by the caller and stored in an acceptance list associated with the caller's service ID on the LDPT database. In the preferred embodiment, the order of the service IDs in the acceptance list indicates the priorities assigned to the other subscribers.

Figure 6:
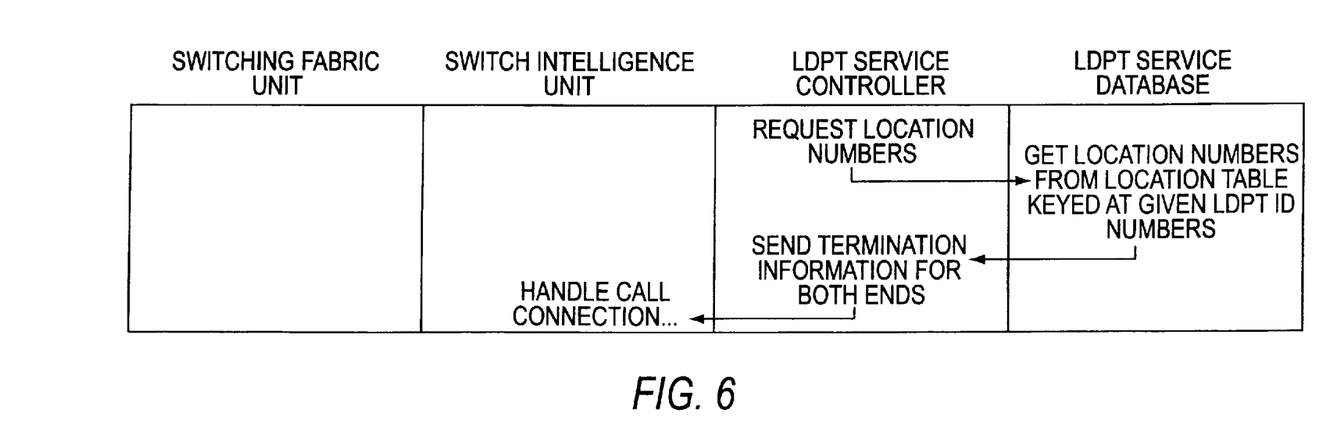

Referring to FIG. 6, the LDPT service controller will consider connecting subscribers whenever certain events occur which include, in particular, a subscriber registering the subscriber's location, a subscriber registering a desired call to another subscriber, or a subscriber registering or altering the subscriber's acceptance list. Also, further connection attempts may occur at regular intervals if a first attempt detects a busy signal at either of the two subscriber's locations.

When any of these events occurs the LDPT service controller consults the call desired table and the location table on the LDPT database. The controller will attempt to connect two subscribers if a first subscriber has registered a desired call to a second subscriber and if both of these subscribers have registered location numbers. Furthermore, if the second subscriber has generated an acceptance list, the LDPT service controller will confirm that the first subscriber ID is on that list before attempting to connect the first and second subscribers.

To connect two subscribers through a telephone call, the LDPT service controller sends a connection request including the location numbers of the two subscribers to the SI unit. The SI unit handles the rest of the call once the request for connection has been made by the LDPT service controller. If the call connects, then the data tuple for the desired call is removed from the table on the LDPT database.

If more than one subscriber has registered a call to the same subscriber, then the LDPT service controller will attempt to connect the called subscriber with the calling subscribers in a first-in-first-out (FIFO) order. The FIFO order can be overridden if the called subscriber has set priorities in the called subscriber's acceptance list.

Operation of the LDPT service is further illustrated by the following example scenario, together with reference to FIGS. 7 through 14 in which, for simplicity of explanation, only phone endpoints and the LDPT service controller and database are shown. All other network components function in the manner described above.

Referring again to FIG. 1, assume there are two businessmen, Alfred and Bernard. Both are going to be in and out of the office today, and in fact, Alfred is flying from New York to Boston around noon, and Bernard is flying from Seattle to Philadelphia in the afternoon. Both want to get in touch with one another to plan a meeting for the next day, and both subscribe to the LDPT service. Assume also that Alfred's LDPT service identification number is 11199 and Bernard's is 44488.

Figure 7:
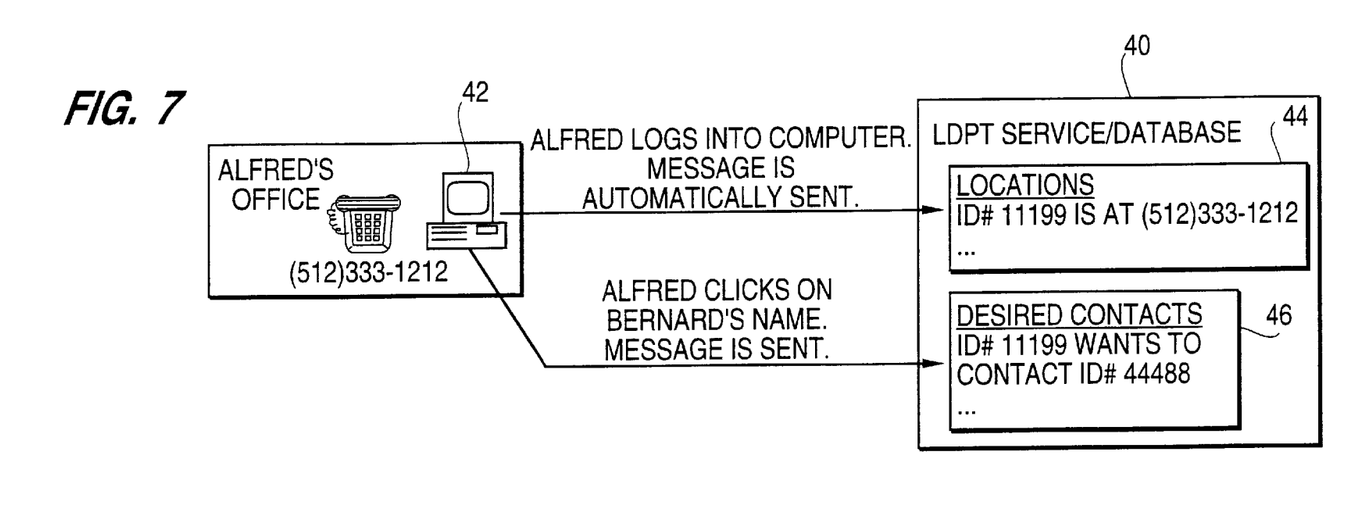
FIGS. 7 to 14 are schematic diagrams showing operation of the LDPT service controller and database connecting two subscribers with each other.

Turning now to FIG. 7, Alfred registers his office number with the LDPT service/database 40 early in the morning by logging into a computer 42 at his office. The login process causes the computer 42 to automatically establish a data call with the LDPT service/database 40 and sends a message whereby Alfred's office number 512-333-1212gets associated with his subscriber ID number 11199 in a location table 44.

Alfred next pulls up a program on his computer 42 with a list of contacts, sees Bernard's name, and decides that he needs to try to set up a meeting with Bernard. Alfred clicks on Bernard's name, and a message containing Bernard's ID 44488 and indicating that Alfred wants to get in touch with Bernard is sent to the LDPT service/database 40. The LDPT service/database 40 maintains an association between Alfred's ID and Bernard's ID in a desired call table 46.

However, Bernard decided to sleep in a little before his flight and conveniently unregistered his home phone from the location table 44 of the LDPT service/database 40 so he would not be disturbed. Therefore, the LDPT service 40 will not yet attempt a call connection between Alfred and Bernard.

Figure 8:
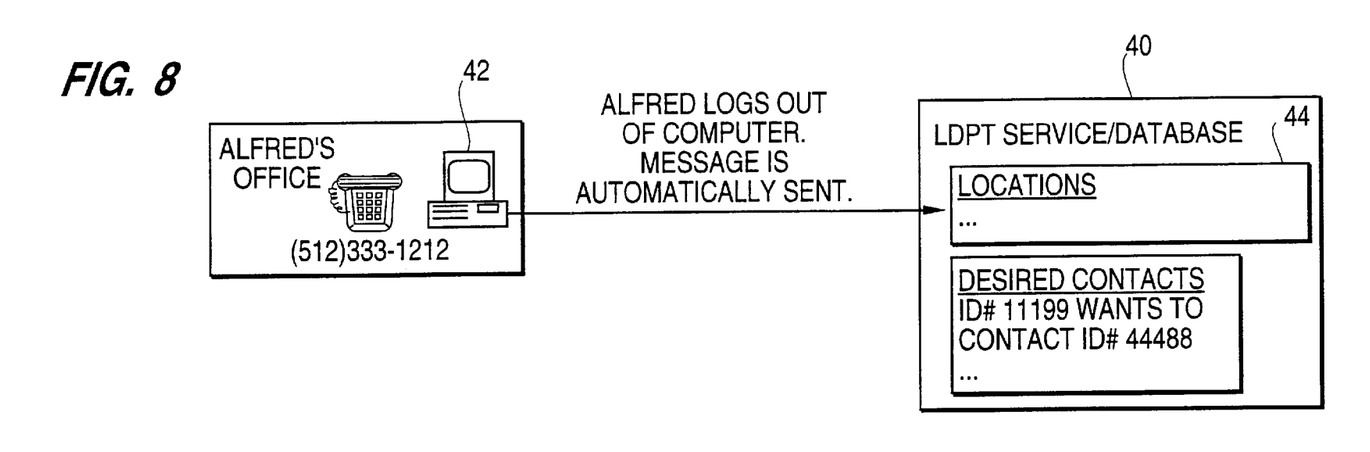

With reference to 8, before noon time, Alfred realizes that he needs to drive out to the airport, so he logs out of his computer 42 which results in a message sent to the LDPT service/database 40 unregistering his number from the location table 44.

Figure 9:
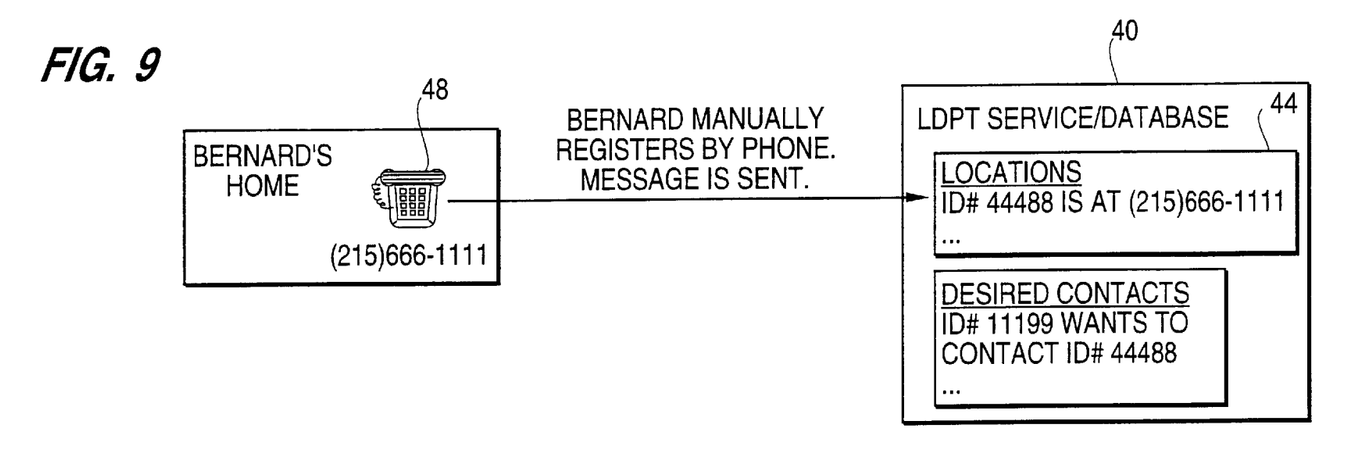

With reference to 9, Bernard finally wakes up around noon, calls from his home telephone 48 the LDPT service/ database 40 and registers his number 215-666-1111 which is added in association with his ID number 44488 to the location table 44, just in case someone wants to get in touch with him while he eats breakfast and packs. Specifically, Bernard may dial a number, like 1-800-888-0000, to access the LDPT service/database 40. Then the LDPT service/database 40 requests a subscriber ID, in response to which Bernard dials his ID number 44488. Next Bernard may enter manually his telephone number 215-666-1111 to register it as his current location. Alternatively, the LDPT service/database 40 may already have Bernard's telephone number which is provided using Automatic Number Identification (ANI) from the network and Bernard then may be prompted, for example, to press "1" for "register this ANI".

Figure 10:
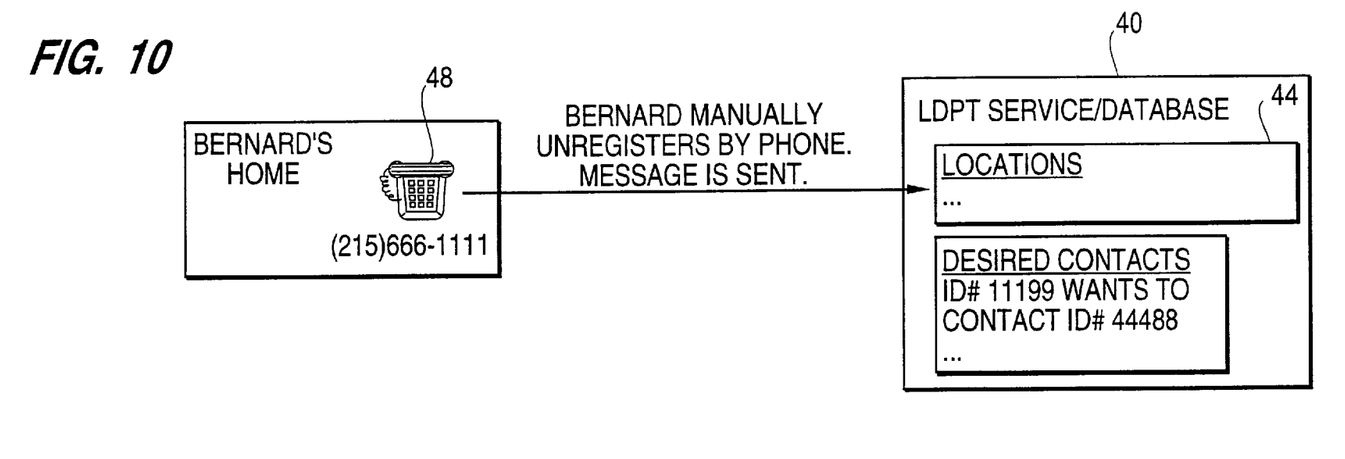

With reference to 10, Bernard finishes getting ready before Alfred's plane lands, and he unregisters his location number by calling 1-800-888-0000 from the home telephone 48, dialing his ID number 44488, and pressing a key on his telephone set corresponding to the command for "unregister me" which results in the LDPT service/database removing his location information from the location table 44.

Figure 11:
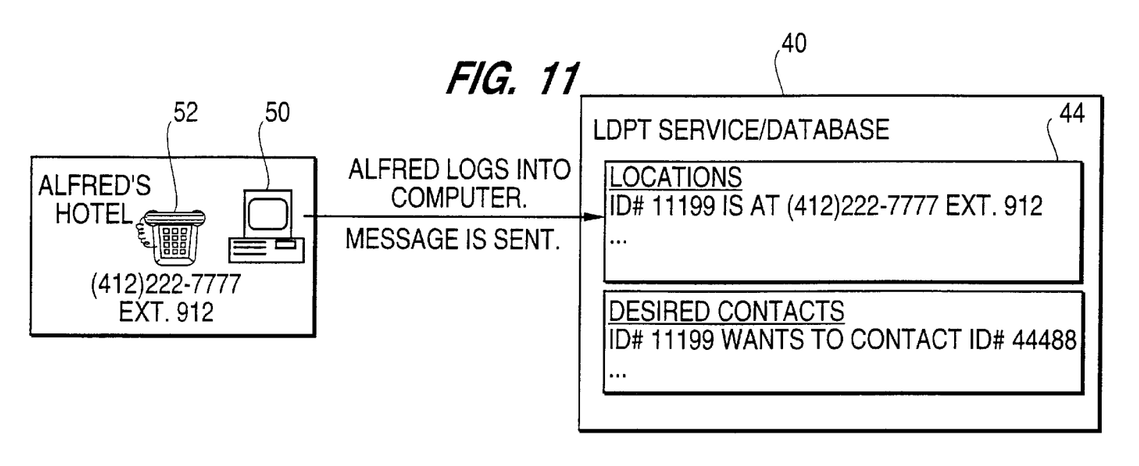

With reference to 11, Alfred's plane lands and he goes to the hotel. He connects his laptop computer 50 to the modem port in his fancy hotel room. As his laptop 50 boots, he is prompted for a number at which people can reach him by the software on his laptop. He looks at the label on the phone 52 in the hotel room and notices that there is an extension, for example, 412-222-7777 ext. 912. He safely assumes that the extension can be automatically dialed and enters it along with the phone number at the prompt, after which the computer 50 sends a message with the entered location information to the LDPT service/database 40 which adds it to the location table 44.

Figure 12:
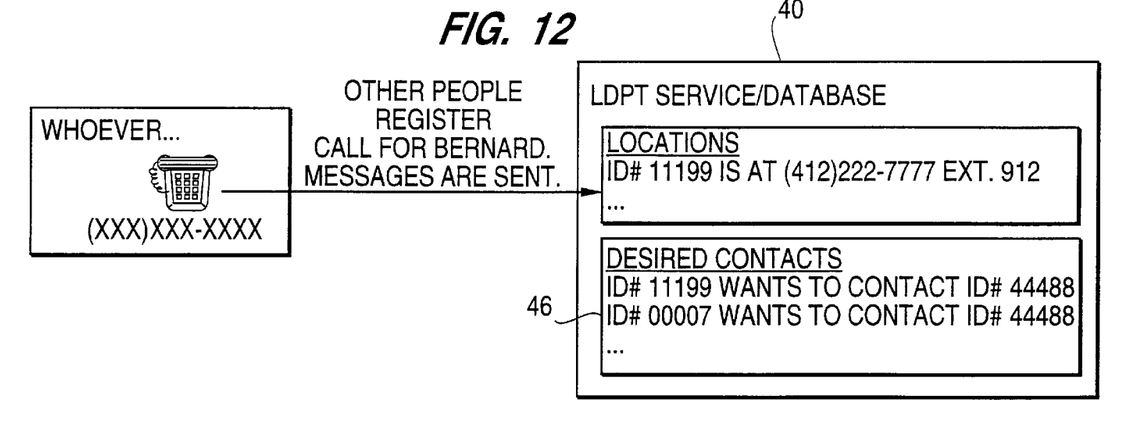

With reference to FIG. 12, in addition to Alfred's earlier registration in the desired call list 46 to contact Bernard, in the meantime, other people who also wish to reach Bernard have registered their desired calls with the LDPT service/database 40.

Figure 13:
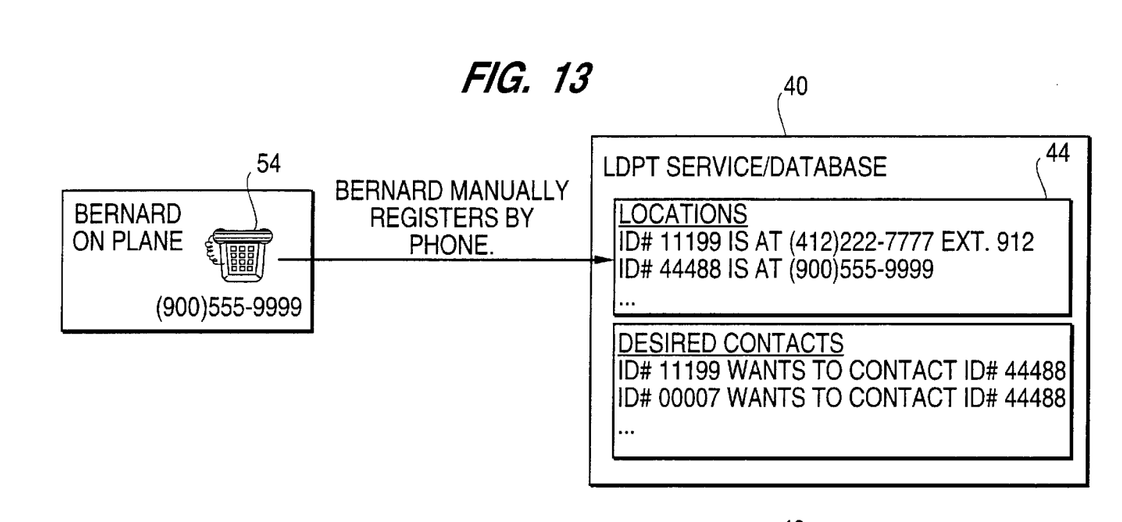

With reference to FIG. 13, Bernard now gets on the plane and notices that there is a phone for every collection of seats on the plane. Bernard decides to register the number of the phone 54 nearest to him with the LDPT service/database 40, since he is going to be in the air for a couple of hours. The LDPT service/database 40 updates the location table 44 with Bernard's ID 44488 in association with telephone number 900-555-9999.

Figure 14:
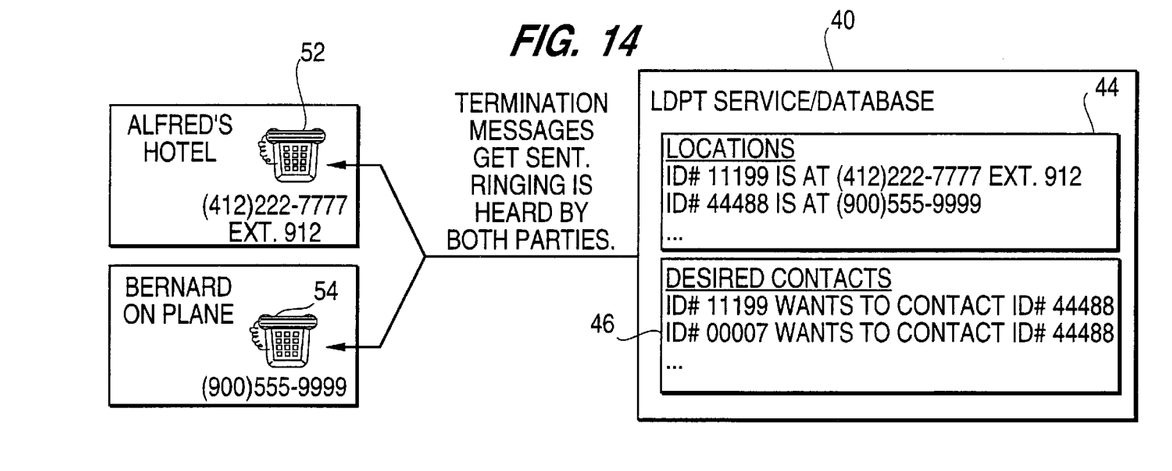

With reference to FIG. 14, the LDPT service/database 40 realizes that both Alfred and Bernard are ready to receive calls. Both have registered locations in the location table 44 and the desired call list 46 includes Alfred's request to contact Bernard. The LDPT service/database 40 checks to make sure that nothing has been blocked, and in this case nothing has. It also checks to see if any priority calls have been set, but in this case none have, so the LDPT service/database 40 then begins to establish connections for Bernard in FIFO order of those available for calls.

Bernard has a number of people who want to contact him, but Alfred is first in the list 46 to be available for calls, so the LDPT service/database 40 sends termination messages for both phones 52 and 54. Ringing is heard on both phones. Subsequently, Alfred and Bernard pick up the respective phones 52 and 54, say hello, and schedule a meeting for the next day in New York.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

I claim:

1. In a telecommunications network, a method of effecting a service for a user to contact a desired subscriber of the service, comprising the steps of:

maintaining subscriber identifiers in association with respective network locations;

updating the subscriber identifiers of subscribers that change network location;

receiving, from the user, a contact requests including an identification of the desired subscriber, and a user network location;

updating the user network location if the user changes network location; and automatically establishing through the network, responsive to correlating the desired subscriber identification to a particular identifier in the maintained subscriber identifiers, a call which terminates at the user network location and the network location associated with the particular subscriber identifier.

2. In a telecommunications network, a method of enabling a first person to contact a second person, comprising the steps of:

maintaining location information including network locations associated with respective identifiers;

receiving, through a call from the first person, an identification of the first person and a request to contact the second person, the request including an identification of the second person;

maintaining, responsive to the contact request, an association between the first person identification and the second person identification;

responsive to correlating the first person identification and the second person identification to respective first and second particular identifiers in the maintained location information, automatically establishing through the network a call that terminates at the network locations associated with the first and second particular identifiers and removing the maintained association between the first person identification and the second person identification; and updating the first particular identifier in the maintained location information if the first person changes network location, and updating the second particular identifier in the maintained location information if the second person changes network location.

3. In a telecommunications network, a system for effecting a service by which a user can contact a desired subscriber of the service, comprising:

means for maintaining subscriber identifiers that identify the subscribers' respective network locations, the subscriber identifiers in the means for maintaining being updatable if a subscriber changes network location;

means for receiving, from the user, a contact request, including an identification of the desired subscriber, and a user network location; and means for automatically establishing through the network, responsive to correlating the desired subscriber identification to a particular identifier in the maintained subscriber identifiers, a call which terminates at the user network location and the network location associated with the particular identifier.

4. In a telecommunications network, a system for enabling a first person to contact a second person, comprising:

means for maintaining location information including network locations associated with respective identifiers, the respective identifiers being updatable if the first person or the second person changes network locations;

means for receiving, through a call from the first person, an identification of the first person and a request to contact the second person, the request including an identification of the second person;

means for maintaining, responsive to the contact request, an association between the first person identification and the second person identification; and means, responsive to correlating the first person identification and the second person identification to respective first and second particular identifiers in the maintained location information, for automatically establishing through the network a call that terminates at the network locations associated with the first and second particular identifiers and for removing the maintained association between the first person identification and the second person identification.

* * * * *